(12) United States Patent
Haub et al.

(10) Patent No.: US 7,373,138 B2
(45) Date of Patent: May 13, 2008

(54) MOBILE WIRELESS COMMUNICATIONS DEVICE ENABLEMENT AND METHODS THEREFOR

(75) Inventors: David Haub, Crystal Lake, IL (US); Michael Kotzin, Buffalo Grove, IL (US)

(73) Assignee: Motorola Inc., Schaumburg, IL (US)

( * ) Notice: Subject to any disclaimer, the term of this patent is extended or adjusted under 35 U.S.C. 154(b) by 333 days.

(21) Appl. No.: 10/301,284

(22) Filed: Nov. 21, 2002

(65) Prior Publication Data
US 2004/0102183 A1 May 27, 2004

(51) Int. Cl.
*H04M 1/66* (2006.01)

(52) U.S. Cl. .................. 455/411; 455/410; 455/412; 455/568; 455/566

(58) Field of Classification Search ............... 455/411, 455/419, 456.1, 456.2, 566, 412, 413, 466; 379/142.02; 713/163
See application file for complete search history.

(56) References Cited

U.S. PATENT DOCUMENTS

| | | | |
|---|---|---|---|
| 5,924,044 A | 7/1999 | Vannatta et al. | |
| 5,933,773 A * | 8/1999 | Barvesten | 455/411 |
| 6,069,534 A | 5/2000 | Kobayashi | |
| 6,072,994 A | 6/2000 | Phillips et al. | |
| 6,240,302 B1 | 5/2001 | Harrison | |
| 6,244,894 B1 | 6/2001 | Miyashita | |
| 6,289,226 B1 * | 9/2001 | Lekven et al. | 455/566 |
| 6,377,810 B1 * | 4/2002 | Geiger et al. | 455/456.2 |
| 6,505,048 B1 * | 1/2003 | Moles et al. | 455/456.1 |
| 6,510,515 B1 * | 1/2003 | Raith | 713/163 |
| 6,675,017 B1 * | 1/2004 | Enzmann et al. | 379/142.02 |
| 2002/0016444 A1 | 2/2002 | Mueller et al. | |
| 2002/0045439 A1 * | 4/2002 | Kushita | 455/412 |
| 2002/0068554 A1 * | 6/2002 | Dusse | 455/419 |
| 2002/0069213 A1 | 6/2002 | Moslander et al. | |
| 2002/0137554 A1 * | 9/2002 | Hanna et al. | 455/568 |

FOREIGN PATENT DOCUMENTS

| | | |
|---|---|---|
| WO | WO 01/40916 A1 | 6/2001 |
| WO | WO 02/23868 A1 | 3/2002 |
| WO | WO 02/49259 A2 | 6/2002 |

* cited by examiner

*Primary Examiner*—David Q. Nguyen
(74) *Attorney, Agent, or Firm*—Roland K. Bowler, II

(57) ABSTRACT

A method for enabling hardware and software features in wireless communications devices including (610) receiving key information and applying it to the communications device. The key information specifies one or more features of the wireless communications device that are to be enabled or disabled. Features of the wireless communications device specified by the key information are enabled (640) or disabled upon applying the key information to the device. In some embodiments, information from multiple keys is required to enable features of the device.

8 Claims, 5 Drawing Sheets

MOBILE WIRELESS COMMUNICATIONS DEVICE ENABLEMENT AND METHODS THEREFOR

FIELD OF THE INVENTIONS

The present inventions relate generally to electronics devices, and more particularly to enabling hardware and software features in electronics devices, including mobile wireless communications devices, applications and methods therefor.

BACKGROUND OF THE INVENTIONS

Portable electronic devices having interchangeable modules are known generally, as disclosed for example in WO 01/40916 A1 entitle "Modularly Configurable Portable Computing Device", which includes a portable gaming device having a removable module portion with an input device selected from a group comprising a keypad, a joystick, a pointer, a receiver, a thermal sensor among other input devices.

It is also known generally to upgrade software in appliances and other devices over a network. US 2002/0069213 A1 entitled "Upgrading A Device Over A Network" discloses upgrading software and databases in an appliance from a client by using a script file downloaded to the client from a server. The upgrade of the appliance is controlled by the script file, which includes appliance identification criteria information used to query appliances on the network. In response to the query, the appliances meeting the identification criteria reply to the client with network address information, whereupon the client upgrades the appliance with the upgraded software and database information.

US 2002/0068554 A1 entitled "Method and System Facilitating Web Based Provisioning of Two-Way Mobile Communications Devices" discloses requesting features selected from a user interface of a mobile communications device by sending a provisioning request to a provisioning server. The request includes mobile device features and services selected by the user in addition to credit card and other financial information of the user. In response to the request, the provisioning server sends, to the mobile device, provisioning content in the form of software modules, which modify the resident features of the mobile device, or activation information required to initialize previously installed non-operational applications. In US 2002/0068554 A1, the provisioning communication between the mobile station and the provisioning server is a secured transaction.

The various aspects, features and advantages of the present invention will become more fully apparent to those having ordinary skill in the art upon careful consideration of the following Detailed Description of the Invention with the accompanying drawings described below.

DETAILED DESCRIPTION OF THE INVENTIONS

The inventions relate generally to the configuration or enabling of electronics devices, including mobile wireless communications handsets, two-way paging devices, personal digital assistants, gaming devices, laptop computers, etc., among other electronics devices.

Figure 1:
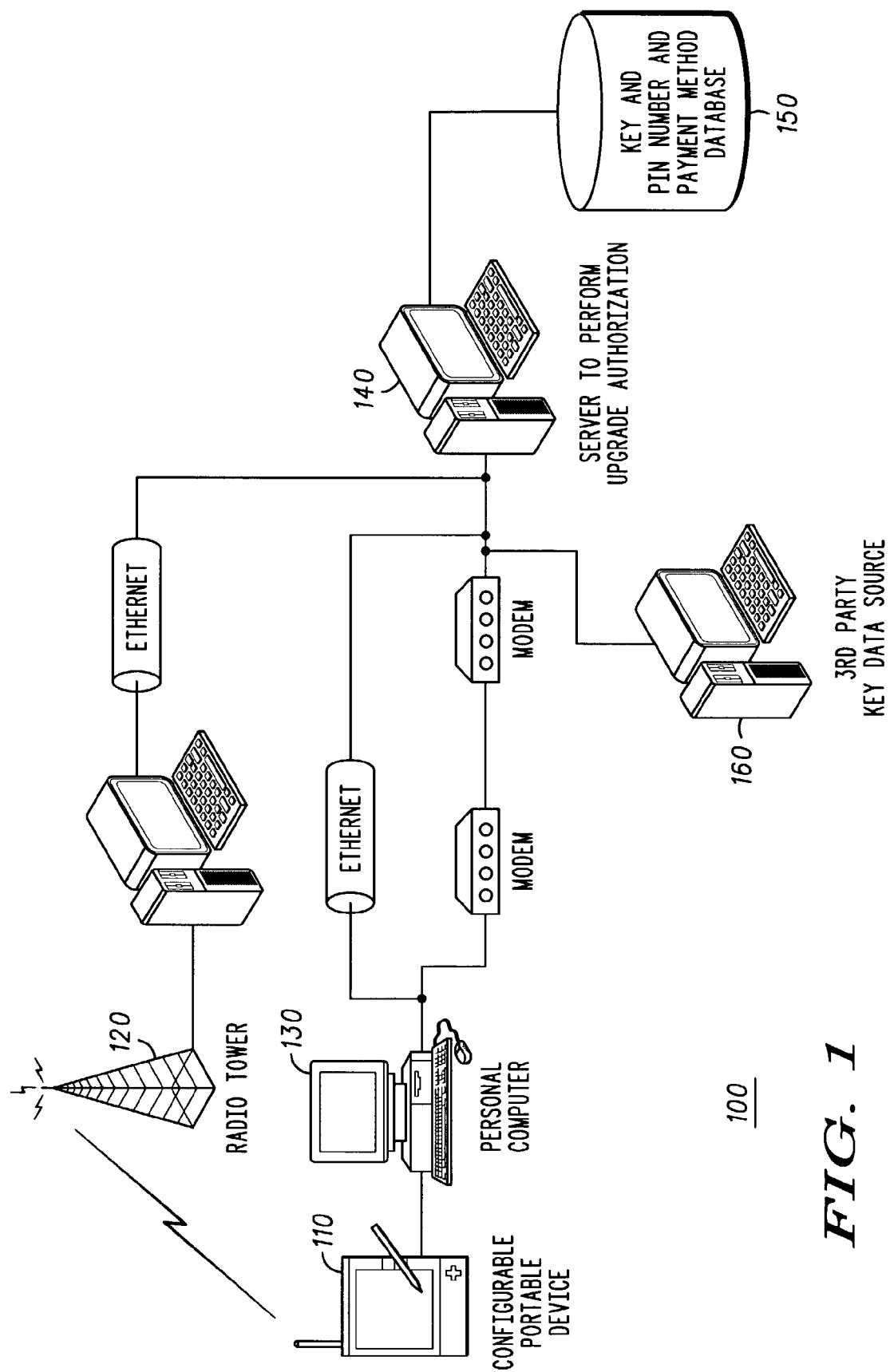
FIG. 1 is an exemplary electronics device in the form of a wireless communications device communicating over a communications network.

In the exemplary system 100 of FIG. 1, a portable wireless communications device 110 communicates with other portable devices and other networks over a communications network including one or more base stations 120 and other known network infrastructure, which is not illustrated. Although the exemplary embodiment is disclosed in the context of mobile wireless communications devices that operate in a communications networks, the invention is not limited to electronics devices having radio communications capabilities, as will become more fully apparent below.

Figure 2:
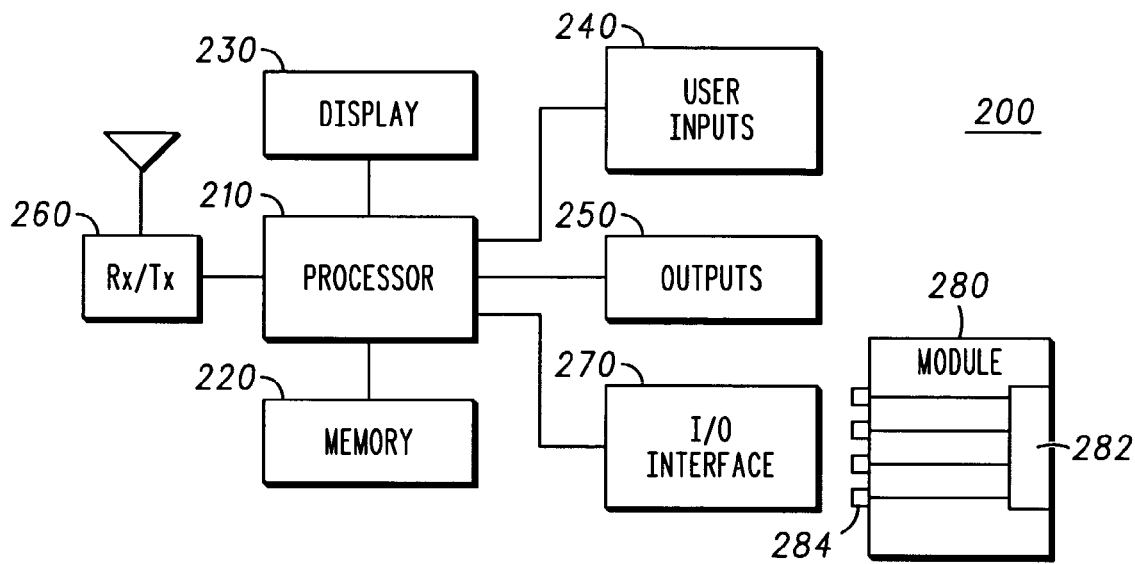
FIG. 2 is a schematic block diagram of an exemplary electronics device in the form of a mobile wireless communications device.

FIG. 2 is a schematic block diagram of an exemplary electronic device 200 comprising generally a processor 210 coupled to memory 220, which typically includes RAM, ROM and possibly other memory devices like an EPROM. The electronic device also includes generally a display 230, for example an LCD display, user inputs 240, like a keypad, joystick or a scrolling device or some other input devices. In some embodiments, the user inputs include an audio microphone for voice communications, among other inputs. The electronics device may also include outputs 250, for example an audio output.

In embodiments where the electronics device 200 is used for wireless communications, the device includes a wireless transceiver 260, for example a transceiver for communicating via the Global System for Mobile Communications (GSM) protocol, which may be combined with a packet data protocol, like GPRS. Alternatively, the transceiver 260 may communicate via a CDMA based communications protocol, for example a Universal Mobile Telephone System (UMTS) implementation of W-CDMA, or some other wireless telephony communications standard.

In one embodiment, the electronics device 200 includes one or more disabled hardware and/or disabled software features residing on the wireless communications device. The hardware and/or software features are preferably fully or substantially installed on the device, but the feature or features are disabled at the outset, for example when the device is manufactured and sold initially.

Exemplary software features include, for example, an FM stereo, audio file mixers, MP3 players, games, multimedia, video, personal information managers, e-mail, etc. among many others software features. In wireless communications devices, the features may include, in addition to any one of those identified above, features associated with communications service provider plans, for example, voice, data and SMS messaging services, TTY digital compatibility for the hearing impaired, instant messaging, gaming, video entertainment etc., among others. One exemplary hardware feature that may be enabled is a radio circuit for communicating with a particular cellular wireless communications protocol. Other exemplary hardware features include, for example, color display, speakerphone capable operation, graphics display mode, non-cellular radio communications, noise canceling microphones, noise reduction systems, etc., among others.

According to one aspect of the invention, one or more disabled hardware and/or software features of the electronics device are enabled by applying key information or data to the device. In one embodiment, the key information specifies some or all features of a group of disabled features residing on the electronics device. In another embodiment, one or more hardware features of a device are enabled upon applying the key information to the device. The key information enables the hardware and/or software features specified upon applying the key information to the device. In other embodiments, the key data is used to disable features that are already enabled.

In some embodiments, more than one key is applied to the device to activate or disable specified device features. In one embodiment, first and second keys enable or disable corresponding features or sets of features. In another embodiment, more than one key is required to enable or disable a particular feature or particular set of features. In one embodiment, for example, a radio circuit for a particular wireless communications protocol is not enabled without first applying both first and second keys to the electronics device. In some embodiments, different key data is applied to the device separately, and in other embodiments different key data is applied to the device in an integrated form.

In one embodiment, the key information is applied to an input of the device. In one mode of operation, for example, the key data may be numeric or alphanumeric data that is input manually by a user at a keypad of the device. In another embodiment, key information is applied to the device by connecting some structure or module bearing the key information to the electronics device, whereupon the key information is communicated to the device as discussed more fully below.

In the exemplary embodiment of FIG. 2, the I/O interface 270 of the electronics device 200 also includes an interface for accepting key data or key information input. In one embodiment, the key information is part of a module 280, for example, key data stored in a memory device 282 that may be read by the device 200 when contacts 284 of the module are connected with or at the I/O interface 270 of the device. In this exemplary embodiment, the key data may be read by addressing the memory device 282 with the processor 210, which may then use the key date or information to enable the hardware or software features specified thereby.

In one embodiment, the module 280 is an interchangeable housing or cover portion having a memory device with key data embedded thereon, for example, insert molded in a plastic member or otherwise fastened to or captured by the module. In other embodiments, the module may be some other component that is removably connectable to the device, for example a memory module or some other plug-in module that is encoded with the key data or information.

In another embodiment, the key data or information is received at a radio receiver of the wireless communication device, for example by the transceiver 260, in a secured or non-secured communication, and the key information is subsequently applied to the wireless communication device after receiving the key information.

In some embodiments, the key information is digitally signed and encrypted before being applied to the device. For example the key data may be signed and encrypted before being communicated over-the-air, thus permitting its transfer to the device in an unsecured communications session. The key data may also be signed and encrypted before being stored in a memory module.

In embodiments where the key data is encrypted, the encrypted data is decrypted upon receipt by the electronics device prior to enabling the features specified thereby. If the key data has also been signed, the signature with which the key information is signed is verified, and the features specified by the key data are enabled only upon verification of the signature.

In some embodiments, the key data or information is uniquely associated with the electronics device for which it specifies features to be enabled so that the key data will enable only features on the device with which it is associated. In embodiments where the electronics device is a wireless communications device, for example, the key data may be associated with a unique identification code or serial number or ESN number thereof. Other electronics devices may have serial numbers or other unique numbers suitable for this purpose.

In some embodiments, the selected features of the wireless communications device are enabled only upon verifying an identity of the user, for example, the user may be required to enter a pre-selected or pre-assigned personal identity number (PIN) in response to a prompt prior to or after applying the key data. This additional level of security may be used in addition to or as an alternative to any one or more of the schemes for digitally signing the key data or encrypting the key data or uniquely associating the key data with a particular electronic device, as discussed above.

Figure 3:
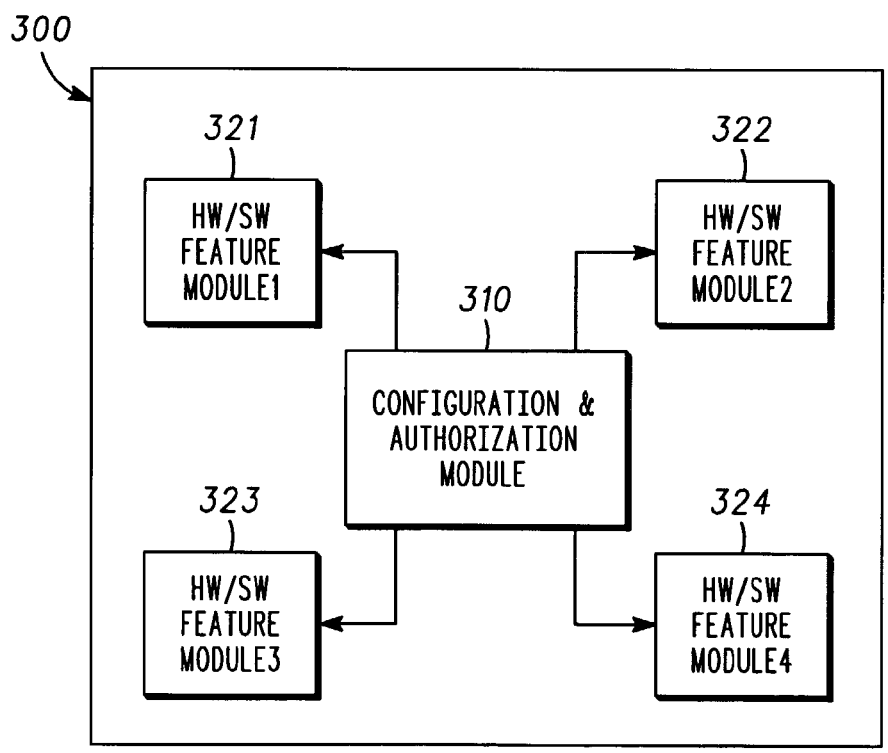
FIG. 3 is a device hardware and software feature configuration and authorization module.

In the partial schematic device block diagram 300 of FIG. 3, the key data is input to a device authorization and configuration module 310, which performs any required deciphering and validation of the key data, which is used to authorize feature activation. The configuration module 310 may be implemented in software and/or hardware on the device. The configuration module 310 uses the key data to enable or activate any hardware and/or software features specified by the key data. These features are illustrated schematically as blocks 321, 322, 323 and 324 in FIG. 3, non-limiting example of which were discussed above.

In one embodiment, the device features are selected or identified by a user of the device, for example upon purchasing the device, or after purchasing the device. The user may select features from a feature selection menu at the device, or alternatively from a feature selection menu located remotely from the electronic device, for example a website. In FIG. 1, the remote location may be at a computer terminal 130 connected by a network like the Internet to an upgrade server 140, for example, a communications service provider website where users may purchase, activate and upgrade such devices. Alternatively, the feature selection process may occur at a point of sale, for example, at a store or kiosk, where with the user or a sales-representative enters the information at a terminal that communicates with the server 140. In some embodiments, the features are selected as a package of features, or alternatively the features may be selected individually, a la carte.

Figure 4:
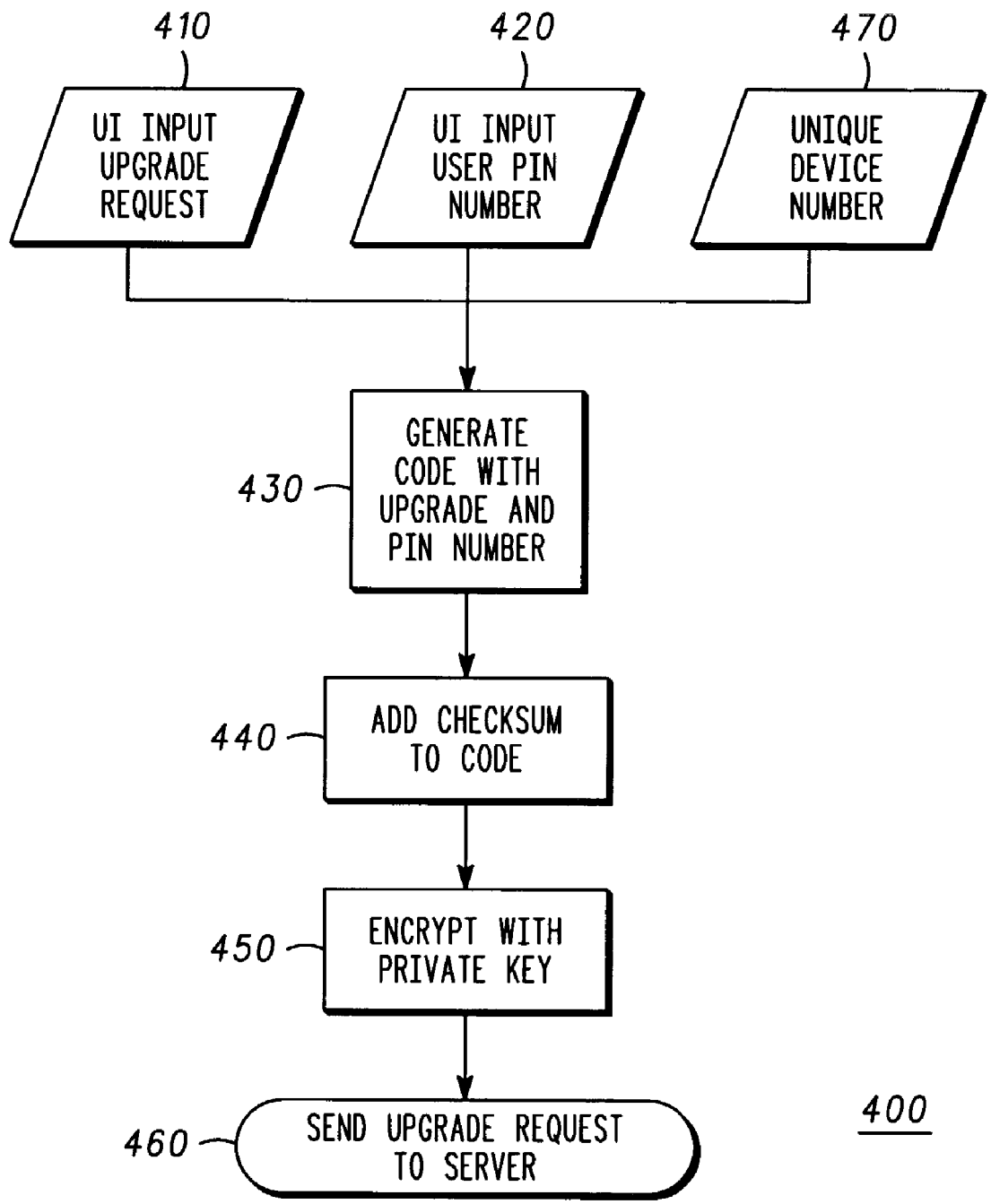
FIG. 4 is an exemplary process for requesting a change in device features.

In the feature selection process diagram 400 of FIG. 4, at block 410, a device feature request is generated, for example, on a wireless communications device or at a website or at some other point of sale location. The selection process is implemented with software, which allows the user to select or de-select features as desired, for example, by displaying various selection menus or prompts on a display and producing a request which identifies the features selected.

At block 420, in some embodiments, the user also inputs a PIN, which may be used to authenticate the user making the request, as discussed below. In some modes of operation, the PIN is input at the time the features are selected. In FIG. 4, at block 430, a code is generated based upon the request and any PIN submitted by the user, for example, by concatenating or otherwise combining the request and PIN. The PIN may be used to uniquely associate the request with a particular user or device, as discussed further below.

In other embodiments, a unique number, for example an ESN or serial number, associated with the device is provided by the user or by the device in addition to the PIN or in lieu thereof, for example at block 470 in FIG. 4. In situations where the PIN is provided to the server for the first time, inclusion of the unique number may be used to associate the PIN with the particular device. Additionally, the ESN may be read from the device using a non-secure communications channel such as universal serial bus, Bluetooth, or a wireless local area network. The unique number is combined with the request and in some embodiments with the PIN to create the code.

The PIN and/or the unique number associated with the device may be used to uniquely associate the key data with the device, so that the key data may be used only on the device with which it is associated, or so that the key data may be used only by the user to whom the key data is provided. This association will generally occur at the time the key data is generated.

An exemplary scheme for creating a device feature enabling code portion is to generate a bit mask comprising a multi-bit sequence having some relationship to the features of the device to be enabled. For example, in embodiments where there is a one-to-one correspondence between bits of the mask and device features, features may be enabled by setting the corresponding bit to "1". In this scheme, software/features having corresponding bits set to "0" remain disabled. Other more complex schemes may be used alternatively. Software residing in the device, for example in the configuration and authorization module 310 of FIG. 3, enables the features based upon the instructions of the bit mask.

In some applications, at block 440, a checksum is added to the code generated at block 430. The checksum may be embodied as some additional bits added to the bit sequence of the code. The checksum may also be a digital signature produced by encrypting a message digest created from a hash function. At block 450, the code, which may include a checksum, is encrypted with a private key. At block 460, the encrypted code is transmitted or otherwise communicated to a source that generates the key data, which will enable or disable the features selected.

In some embodiments, the process of FIG. 4 or parts thereof are unnecessary, for example, where the user orally communicates features desired in a face-to-face or a telephonic transaction. In these types of transactions, a service representative may manually enter the feature selections for the user. The request generated in this manner may or may not require encryption and a signature, depending on the where the transaction occurs and how the request is communicated to the key data generating server. The user may also be prompted to enter a PIN, which may be communicated to the server for generating the code.

Figure 5:
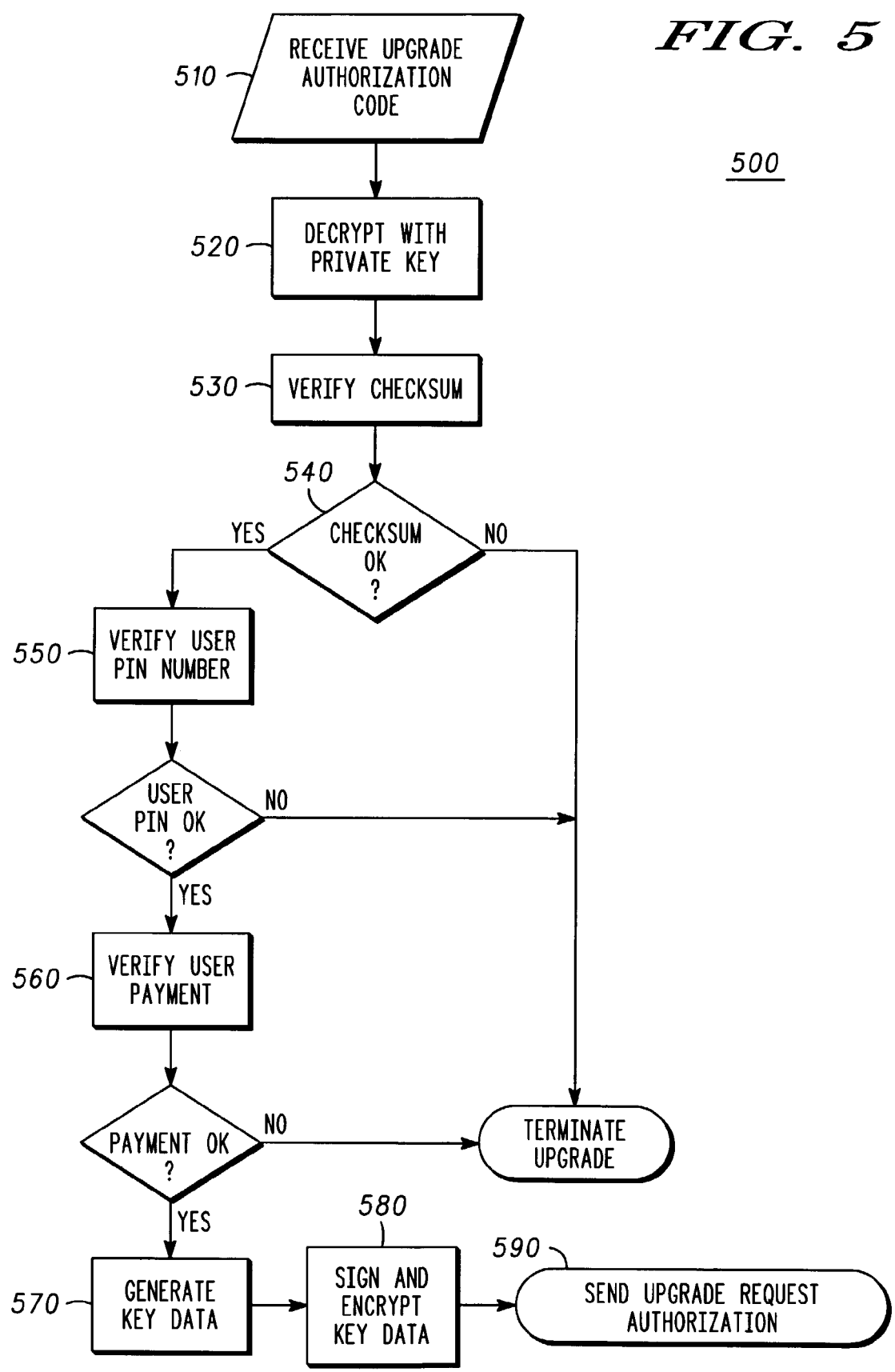
FIG. 5 is an exemplary process for generating key data or information, which may be used to enable or disable features on an electronics device.

In FIG. 5, at block 510, the upgrade request is received at a server or other source for generating the key data, for example the server 140 in FIG. 1. If the code is encrypted, the code is decrypted, for example with a public key, at block 520, at the server or authorizing authority. At block 530, any checksum is verified, for example by decrypting the signature to re-produce a message digest created by the sender. If the checksum is verified, at block 540, any user PIN that is included is also verified at block 550, for example by comparing the PIN with a previously submitted PIN. In some instances, the user PIN will have been registered previously with the server, and in other cases the PIN is registered for the first time. If the PIN has not been provided to the server previously a copy thereof may be stored in association with the unique number of the device.

In some transactions, consideration will be exchanged for the features selected for enablement upon applying the key data to the electronics device. Thus in FIG. 1, the server 140 may also process payment for the key data, although payment processing may be performed at some other server or entity than the server 140. In FIG. 5, at blocks 560, payment is verified or billing is processed at the server, although in other embodiments payment verification and billing processing may be performed at some other entity, either before or after the generation of the key data.

In FIG. 5, at block 570, key data is generated based upon the features selected in the code. In FIG. 1, for example, the key data is obtained from a database 150 via the server 140 based on the features identified or selected. In other embodiments, however, the key data may be obtained from some other source. The key data is in a form that is recognized by the device, for example, by the configuration and authorization module 310 in FIG. 3, when the key data is input or applied to the device.

In some embodiments, separate key data may be required to enable different features on the device. For example, some features may be subject to a third party license. In some embodiments, the separate key data is combined into a single key data. In FIG. 1, for example, the server 140 may obtain third party key data from a third party 160, and integrate the third party key with a key generated at the server 140. Alternatively, the server may provide the third party key data separately from the key data generated by the server, by any one or more of the means discussed above. The third party key data may be provided directly to the device from the third party, for example, in an over-the-air communication.

As noted above, the key data may be uniquely associated with a particular electronics device or a particularly user, based for example on the unique identification number and/or the PIN. More generally however, the key data may be generated without the PIN or unique identification information. In some embodiments, at block 580, the key data may be signed and encrypted before being provided, at block 590, for application to the device.

The key data may be transmitted to the device over a wireless communications network in a secured or unsecured transaction. The key data is preferably encrypted as discussed above in connection with FIG. 5 for transmission over a wireless network, especially when transmitted in an unsecured communications session, for example over the wireless network 120 of FIG. 1. The key data may also be flashed into memory embedded in a module for application to the device upon connecting the module to the device, as discussed.

As noted, feature selection may occur during the initial purchase transaction, but it also occurs preferably in separate subsequent transactions for which the users give additional consideration. These subsequent transactions may be feature activation sessions, or feature upgrade sessions and in some cases downgrade sessions, since the key data may also be used to downgrade or disable previously enabled features.

Alternatively, the key data may merely be an alphanumeric code provided to the user for manual input to the device.

Figure 6:
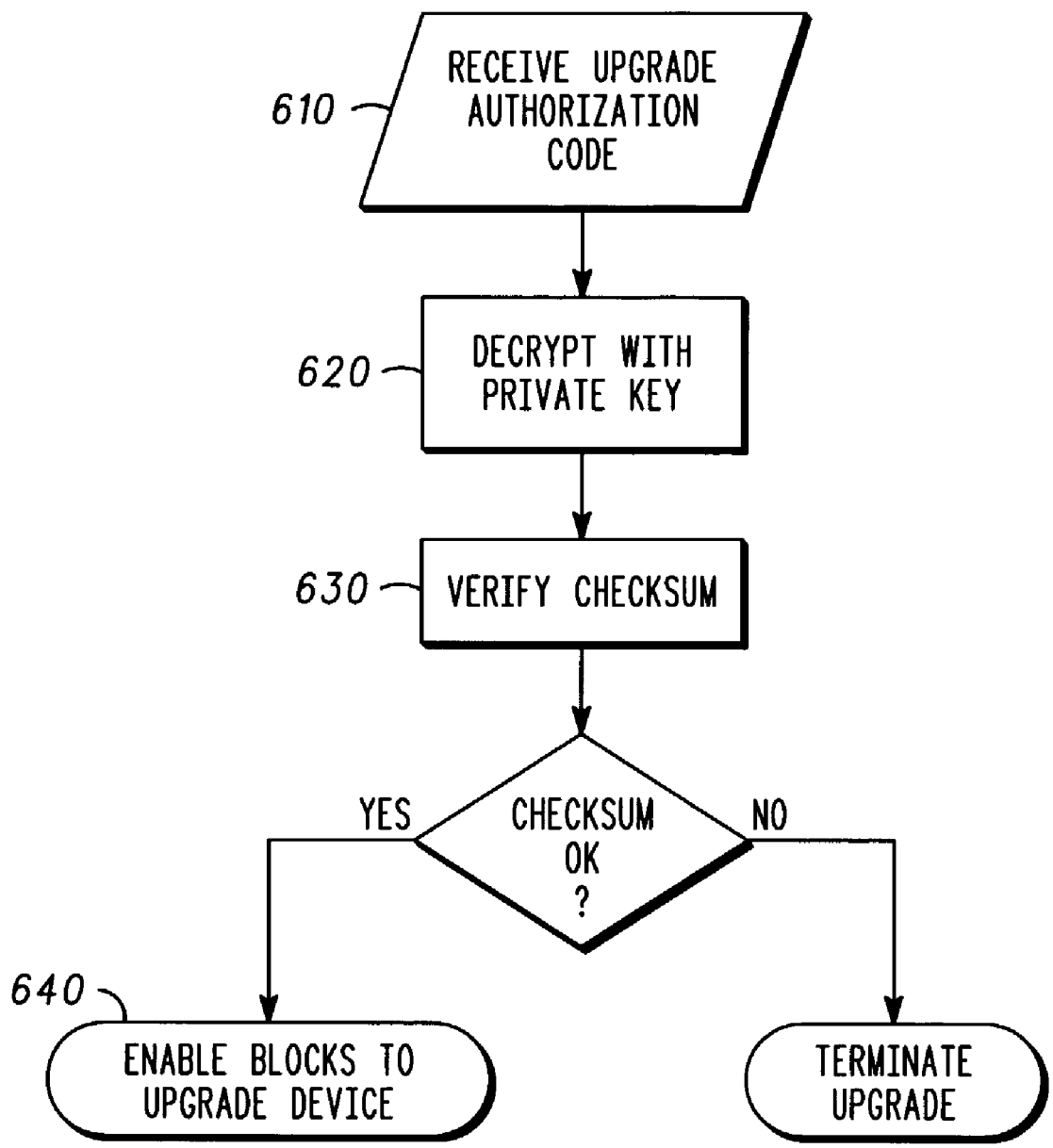
FIG. 6 is an exemplary process for processing key data in an electronics device.

In the key data processing diagram 600 of FIG. 6, at block 610, the key data is input to the device according to any one of the various methods discussed above, among other not specifically disclosed herein. At block 620, the key data is decrypted if necessary, and at block 630 the any checksum applied to the key data by the authorizing server is verified. If the checksum is verified, at block 640, the key data is used to enable or disable the features specified. In some embodiments where the key data includes user identity such as a PIN and device identity such as an ESN, these will be verified before allowing the upgrade of the device. As noted above, the processing of the key data on the device is generally performed by software, for example the configuration and authorization module 310 in FIG. 3.

While the present inventions and what are considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A method in a wireless communications device, comprising:

applying key information to the wireless communications device by connecting a structural element bearing the key information to the wireless communications device, the key information specifying at least one feature of a group of de-activated features residing on the wireless communications device, the de-activated features are not user-accessible, activating the at least one feature of the wireless communications device specified by the key information upon applying the key information to the wireless communications device, wherein the at least one feature becomes user-accessible upon activation.

2. The method of claim 1, applying key information to the wireless communications device includes manually entering key information at a user input of the wireless communications device.

3. The method of claim 1, applying second key information to the wireless communications device, the second key information different than the first key information, the second key information specifying at least one feature of the wireless communications device, activating the at least one feature specified by the second key information upon applying the second key information to the wireless communications device.

4. The method of claim 1, not activating a radio circuit for a particular wireless communications protocol without applying a second key to the wireless communications device.

5. The method of claim 1, activating at least one hardware feature of the wireless communications device upon applying the key information to the wireless communications device.

6. The method of claim 1, activating at least two features of a group of de-activated software features residing on the wireless communications device upon applying the key information to the wireless communications device.

7. The method of claim 1, applying key information to the wireless communications device includes applying key information that is uniquely associated with the wireless communications device.

8. The method of claim, 1, enabling or disabling the selected features of the wireless communications device by applying the key information to the wireless communications device only upon verifying a user identity.

* * * * *